United States Patent
Lee et al.

(10) Patent No.: US 10,209,574 B2
(45) Date of Patent: Feb. 19, 2019

(54) LIQUID CRYSTAL DISPLAY

(71) Applicant: SAMSUNG DISPLAY CO., LTD., Yongin-si, Gyeonggi-do (KR)

(72) Inventors: Sang-Myoung Lee, Seoul (KR); Seung Jun Yu, Cheonan-si (KR); O Sung Seo, Seoul (KR); Joong Gun Chong, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/018,673

(22) Filed: Feb. 8, 2016

(65) Prior Publication Data

US 2016/0320646 A1    Nov. 3, 2016

(30) Foreign Application Priority Data

Apr. 30, 2015 (KR) .................. 10-2015-0062066

(51) Int. Cl.
*G02F 1/1339* (2006.01)
*G02F 1/1343* (2006.01)
*G02F 1/1333* (2006.01)

(52) U.S. Cl.
CPC ...... *G02F 1/1339* (2013.01); *G02F 1/134336* (2013.01); *G02F 2001/133388* (2013.01); *G02F 2001/134345* (2013.01)

(58) Field of Classification Search
CPC ............ G02F 1/1339; G02F 1/134309; G02F 1/133514; G02F 2001/133388
See application file for complete search history.

(56) References Cited

U.S. PATENT DOCUMENTS

| | | | | |
|---|---|---|---|---|
| 6,317,186 B1* | 11/2001 | Miwa | ............... | G02F 1/1339 349/153 |
| 7,542,123 B2* | 6/2009 | Manabe | ............... | G02F 1/1339 349/153 |
| 8,451,414 B2* | 5/2013 | Nonaka | ............. | G02F 1/133514 349/146 |
| 2010/0045922 A1* | 2/2010 | Motomatsu | ........... | G02F 1/1339 349/156 |

FOREIGN PATENT DOCUMENTS

| | | |
|---|---|---|
| JP | 2005-181795 A | 7/2005 |
| JP | 2010-286825 A | 12/2010 |
| KR | 2001-0111846 A | 12/2001 |
| KR | 10-2004-0044661 A | 5/2004 |
| KR | 10-2005-0056799 A | 6/2005 |
| KR | 10-2012-0122227 A | 11/2012 |

OTHER PUBLICATIONS

JPO english machine translation of JP2010286825A.*

* cited by examiner

*Primary Examiner* — Edward Glick
*Assistant Examiner* — David Chung
(74) *Attorney, Agent, or Firm* — Innovation Counsel LLP

(57) ABSTRACT

A liquid crystal display according to an exemplary embodiment includes a display substrate including a display area for displaying an image and a non-display area enclosing the display area; a plurality of normal pixels formed in an edge region among a center region of the display area and a peripheral area of the display area, and a plurality of corner pixels formed in a corner region of the peripheral area of the display area; and a sealant formed in the non-display area. A corner pixel of the plurality of corner pixels and the sealant are separated from each other.

6 Claims, 8 Drawing Sheets

LIQUID CRYSTAL DISPLAY

CROSS-REFERENCE TO RELATED APPLICATION

This application claims priority to and the benefit of Korean Patent Application No. 10-2015-0062066 filed in the Korean Intellectual Property Office on Apr. 30, 2015, the disclosure of which is incorporated herein by reference in its entirety.

BACKGROUND

1. Field

The present disclosure relates to a liquid crystal display.

2. Description of the Related Art

A liquid crystal display includes two sheets of display panels in which electrodes are formed, and a liquid crystal layer interposed between the two sheets of display panels. The liquid crystal display displays an image by generating an electric field on the liquid crystal layer by applying a voltage to the field generating electrodes, determining alignment directions of liquid crystal molecules of the liquid crystal layer by the generated electric field, and controlling the polarization of incident light.

Recently, narrow bezel display devices have been developed. A narrow bezel display device has a minimized area of the bezel that corresponds to a non-display area of the liquid crystal display. For example, a narrow bezel display device has a bezel of 0.5 mm. When coating a sealant of the narrow bezel, it is difficult to perpendicularly form the sealant in four corners due to a limitation of a sealant coating device, and thus the sealant is formed of a curved line in the corners. Accordingly, the pixels positioned close to the corners overlap the sealant such that pixel failure may easily occur.

The above information disclosed in the Background section is only to enhance the understanding of the background of the present disclosure and may contain information that does not form a prior art that may be already known to a person of ordinary skill in the art.

SUMMARY

The present disclosure provides a liquid crystal display that eliminates a failure of pixels that are positioned near or at the corners in a narrow bezel structure.

A liquid crystal display according to an exemplary embodiment of the present disclosure includes a display substrate including a display area displaying an image and a non-display area enclosing the display area; a plurality of normal pixels formed in an edge region among a center region of the display area and a peripheral area of the display area, and a plurality of corner pixels formed in a corner region among the peripheral area of the display area; and a sealant formed in the non-display area. A corner pixel of the plurality of corner pixels and the sealant are separated from each other.

The corner pixel and the sealant may not overlap each other.

The sealant may include a corner sealant formed at a position corresponding to the corner region and an edge sealant formed at a position corresponding to the edge region, and the corner sealant may be separated from an outer boundary of the corner pixel.

The normal pixel may include a normal switching element and a normal pixel electrode connected to the normal switching element, the corner pixel may include a corner switching element and a corner pixel electrode connected to the corner switching element, and a size of the corner pixel electrode may be different from a size of the normal pixel electrode.

The size of the corner pixel electrode may be smaller or larger than the size of the normal pixel electrode.

The corner pixel electrode may be formed to conform to a shape of an outer line of the corner sealant.

The corner pixel electrode may not overlap the corner sealant.

A lower dam formed on the non-display area of the display substrate; a facing substrate facing the display substrate; and an upper dam formed on the facing substrate may be further included. The lower dam and the upper dam may be formed at positions facing each other.

The lower dam may be formed between the sealant and the corner pixel.

A plurality of color filters formed under the normal pixel electrode and the corner pixel electrode may be further included. The lower dam may be formed in a same layer as the color filter.

A common electrode formed on the facing substrate and a spacer formed on the common electrode may be further included. The upper dam may be formed in a same layer as the spacer.

According to the present disclosure, by reducing or expanding the size of a corner pixel electrode of a corner pixel, the corner pixel electrode does not overlap the sealant, thereby preventing pixel failure. Accordingly, even if a perpendicularly formed sealant coating device is not separately used, failures of the pixels positioned near or at the corners may be reduced or eliminated.

Also, the corner sealant may be formed to be rounded and the corner of the liquid crystal display may be formed to be rounded to minimize the effect of an external impact and enhance the design characteristics.

Also, the sealant and the corner pixel do not overlap, such that a degree of the spread of the sealant is uniform in the assembly after a coating process. Accordingly, the non-uniform spread of the sealant that may occur when the sealant and the corner pixel overlap each other can be prevented.

In addition, by forming the dam made of the lower dam and the upper dam at positions facing each other inside the sealant, the sealant may be prevented from spreading to the display area when the lower panel and the upper panel are combined.

DETAILED DESCRIPTION OF THE EMBODIMENTS

Figure 1:
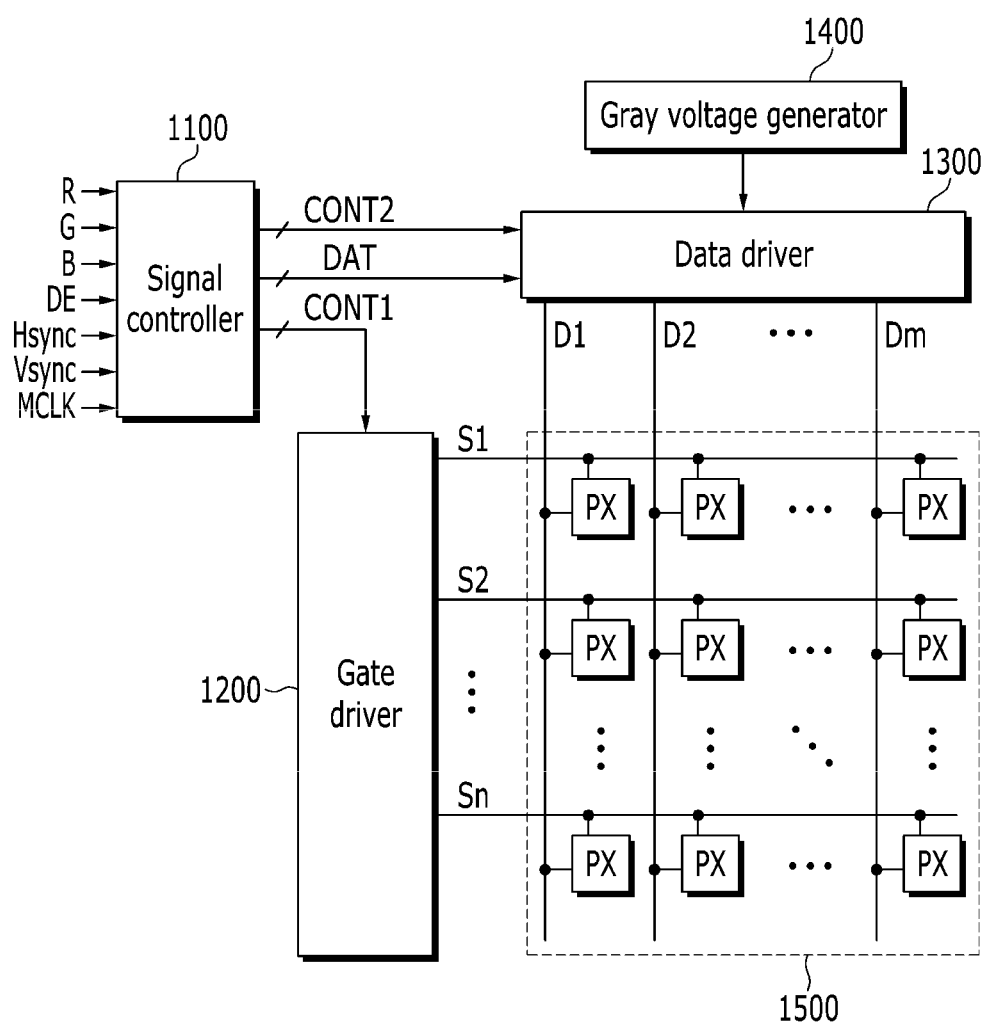
FIG. 1 is a block diagram of a liquid crystal display according to an exemplary embodiment of the present disclosure.

The present disclosure will be described more fully hereinafter with reference to the accompanying drawings, in which exemplary embodiments of the present disclosure are shown. As those skilled in the art would realize, the described embodiments may be modified in various different ways, without departing from the spirit or scope of the present disclosure.

In order to clearly describe the present disclosure, parts unrelated to the descriptions may be omitted. Throughout the present disclosure, like reference numerals refer to like or similar constituent elements.

In addition, the size and thickness of each configuration shown in the drawings are arbitrarily shown to facilitate understanding and ease of description, but the present disclosure is not necessarily limited thereto. In the drawings, the thickness of layers, films, panels, regions, etc., may be exaggerated for clarity. In the drawings, for better understanding and ease of description, the thicknesses of some layers and areas may be exaggerated.

In addition, unless explicitly described to the contrary, the word "comprise" and variations such as "comprises" or "comprising" will be understood to imply the inclusion of stated elements but not the exclusion of any other elements. It will be understood that when an element such as a layer, film, region, or substrate is referred to as being "on" another element, the element can be directly on the other element or one or more intervening elements may also be present. Further, in the specification, the word "on" means positioned on or below the object portion, but does not essentially mean positioned on the upper side of the object portion based on a gravitational direction. Also, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements. Further, in the specification, the phrase "on a plane" means viewing an object portion from the top, and the phrase "on a cross-section" means viewing a cross-section of which the object portion is vertically cut from a side.

Next, a liquid crystal display according to an exemplary embodiment of the present disclosure will be described with reference to the accompanying drawings. FIG. 1 is a block diagram of a liquid crystal display according to an exemplary embodiment of the present disclosure. The liquid crystal display includes a signal controller 1100, a gate driver 1200, a data driver 1300, a gray-level voltage generator 1400, and a liquid crystal panel assembly 1500. The liquid crystal panel assembly 1500 includes a plurality of gate lines S1 to Sn, a plurality of data lines D1 to Dm, and a plurality of pixels PX. The plurality of pixels PX are arranged in an approximate matrix form while being connected to the plurality of gate lines S1 to Sn and the plurality of data lines D1 to Dm. The plurality of gate lines S1 to Sn substantially extend in a row direction and are nearly parallel to each other. The plurality of data lines D1 to Dm substantially extend in a column direction and are nearly parallel to each other. Herein, only the plurality of gate lines S1 to Sn and data lines D1 to Dm are illustrated to be connected to the plurality of pixels PX, but various signal lines such as a power supply line, a divided reference voltage line, and the like may be additionally connected to the plurality of pixels PX depending on the structure and configuration of the pixels PX, a driving method, and the like.

Meanwhile, one or more backlights (not shown) may be provided at a rear side of the liquid crystal panel assembly 1500 to control luminance of an image that is displayed on the liquid crystal panel assembly 1500. The backlights emit light to the liquid crystal panel assembly 1500.

The signal controller 1100 receives image signals R, G, and B and an input control signal. The image signals R, G, and B contain luminance information of the plurality of pixels. Luminance has a predetermined number of gray levels, for example, $1024=2^{10}$, $256=2^8$, or $64=2^6$ gray levels. The input control signal includes a data enable signal DE, a horizontal synchronizing signal Hsync, a vertical synchronization signal Vsync, and a main clock signal MCLK.

The signal controller 1100 generates a gate control signal CONT1, a data control signal CONT2, and an image data signal DAT according to the image signals R, G, and B, the data enable signal DE, the horizontal synchronization signal Hsync, the vertical synchronization signal Vsync, and the main clock signal MCLK. The signal controller 1100 identifies the image signals R, G, and B for each frame according to the vertical synchronization signal Vsync and for each gate line according to the horizontal synchronization signal Hsync, and generates the image data signal DAT.

The signal controller 1100 provides the image data signal DAT and the data control signal CONT2 to the data driver 1300. As a signal for controlling operation of the data driver 1300, the data control signal CONT2 includes a horizontal synchronization start signal STH for instructing a transmission start of the image data signal DAT, a load signal LOAD for instructing the data lines D1 to Dm to output a data signal, and a data clock signal HCLK. The data control signal CONT2 may further include a reverse signal RVS for reversing a voltage polarity of the image data signal DAT with respect to a common voltage Vcom.

The signal controller 1100 provides the gate control signal CONT1 to the gate driver 1200. The gate control signal CONT1 includes at least one clock signal for controlling an output of a scanning start signal STV and a gate-on voltage of the gate driver 1200. The gate control signal CONT1 may further include an output enable signal OE for limiting a duration of the gate-on voltage.

The data driver 1300 is connected to the data lines D1 to Dm of the liquid crystal panel assembly 1500 and selects gray-level voltages from the gray-level voltage generator 1400. The data driver 1300 applies the selected gray-level voltages as the data signal to the data lines D1 to Dm. The gray-level voltage generator 1400 may not provide voltages for all gray levels but instead may provide only a predetermined number of reference gray-level voltages. In this case, the data driver 1300 may divide the reference gray-level voltages to generate the gray-level voltages for all the gray levels and select the data signal from the generated gray-level voltages.

The gate driver 1200 applies a gate signal including a gate-on voltage and a gate-off voltage for respectively turning on and off the switching elements (Qa, Qb, and Qc of FIG. 2) that are connected to the gate lines S1 to Sn of the liquid crystal panel assembly 1500.

The signal controller 1100, the gate driver 1200, the data driver 1300, and the gray-level voltage generator 1400 that are described above may be directly mounted on the liquid crystal panel assembly 1500 or on a flexible printed circuit film (not shown) as at least one integrated circuit (IC) chip, or may be attached to the liquid crystal panel assembly 1500 or mounted on a printed circuit board (PCB) (not shown) as a tape carrier package (TCP). Alternatively, the signal controller 1100, the gate driver 1200, the data driver 1300, and the gray-level voltage generator 1400 may be integrated into the liquid crystal panel assembly 1500 along with the signal lines S1 to Sn and D1 to Dm.

Figure 2:
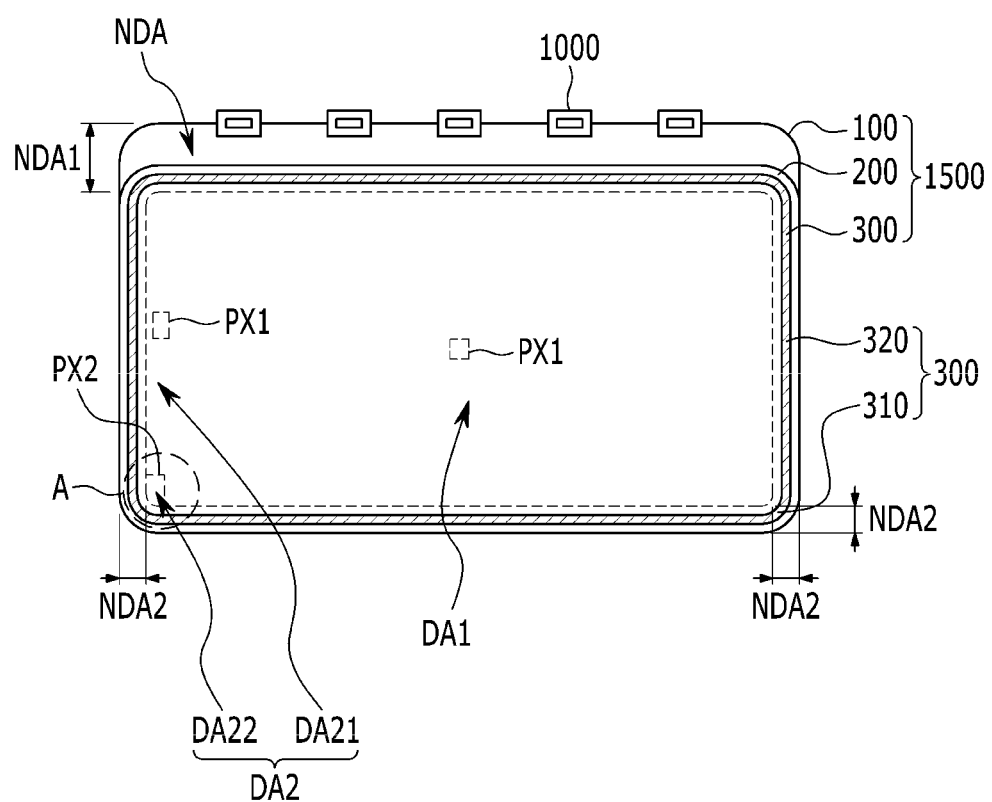
FIG. 2 is a top plan view of a liquid crystal display according to an exemplary embodiment of the present disclosure.

FIG. 2 is a top plan view of a liquid crystal display according to an exemplary embodiment of the present disclosure. As shown in FIG. 2, the liquid crystal display includes a liquid crystal panel assembly 1500 and an IC chip 1000 mounted on the liquid crystal panel assembly 1500. The IC chip 1000 includes the signal controller 1100, the gate driver 1200, the data driver 1300, and the gray voltage generator 1400.

The liquid crystal panel assembly 1500 includes a lower panel 100 and an upper panel 200 facing each other, and a liquid crystal layer 3 (referring to FIG. 6) interposed between the lower panel 100 and the upper panel 200. The upper panel 200 is also referred to as a facing display panel that faces the lower panel 100. The lower panel 100 and the upper panel 200 are combined by a sealant 300.

Shown in a plan view, the lower panel 100 has a display area DA including a plurality of pixels PX and a non-display area NDA outside the display area DA. In FIG. 2, the inside of the dotted line quadrangle represents the display area DA and the outside thereof represents the non-display area NDA. An image is displayed in the display area DA by the plurality of pixels PX, and the non-display area NDA corresponds to a bezel.

The display area DA includes a center region DA1 corresponding to the center of the display area DA and a peripheral area DA2 corresponding to a periphery of the display area DA. The peripheral area DA2 includes an edge region DA21 corresponding to an edge of the peripheral area DA2 and a corner region DA22 corresponding to a corner of the peripheral area DA2. The plurality of pixels PX includes a plurality of normal pixels PX1 formed in the center region DA1 and the edge region DA21 and a plurality of corner pixels PX2 formed in the corner region DA22.

The non-display area NDA may include a first non-display area NDA1 and a second non-display area NDA2. As an area corresponding to one edge side of the liquid crystal panel assembly 1500, the first non-display area NDA1 is relatively wider than the second non-display area NDA2. In the first non-display area NDA1, the IC chip 1000 may be disposed. The second non-display area NDA2 is relatively narrower than the first non-display area NDA1, corresponding to a narrow bezel. The second non-display area NDA2 may be an area corresponding to the other three edge sides of the liquid crystal panel assembly 1500. A width of the second non-display area NDA2 may be less than about 0.5 mm. Four corners of the lower panel 100 may be formed to be rounded, and four corners of the upper panel 200 may also be formed to be rounded.

A sealant 300 is formed in the non-display area NDA. The sealant 300 includes a corner sealant 310 formed at a position corresponding to the corner region DA22 and an edge sealant 320 formed at a position corresponding to the edge region DA21. The corner sealant 310 is formed to be rounded at the positions corresponding to the four corners of the upper panel 200. As described above, the corner sealant 310 may be formed to be rounded to conform to the corner of the liquid crystal display. The rounded corner of the liquid crystal display minimizes the effect of an external impact and enhance design characteristics.

Figure 3:
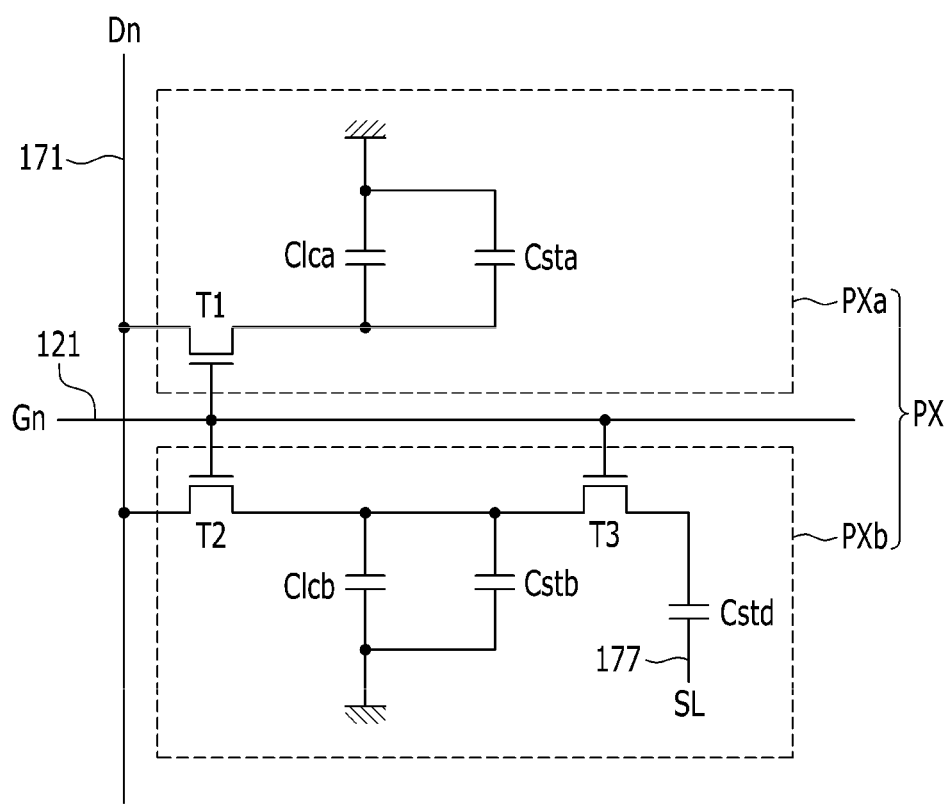
FIG. 3 is an equivalent circuit diagram of a pixel of a liquid crystal display according to an exemplary embodiment of the present disclosure.

Next, a structure of the pixel PX disposed in the display area DA and the sealant 300 disposed in the non-display area NDA in the liquid crystal display, according to an exemplary embodiment of the present disclosure, will be described with reference to FIG. 3, FIG. 4, FIG. 5, FIG. 6, FIG. 7, and FIG. 8. First, a schematic structure and an operation of the pixel PX disposed in the display area DA in the liquid crystal display according to an exemplary embodiment of the present disclosure will be described with reference to FIG. 3. FIG. 3 is an equivalent circuit diagram of a pixel of a liquid crystal display according to an exemplary embodiment of the present disclosure. As shown in FIG. 3, the liquid crystal display includes a plurality of signal lines 121, 171, and 177, and a plurality of pixels PX connected to the plurality of signal lines 121, 171, and 177.

The signal lines 121, 171, and 177 include a gate line 121 transmitting a gate signal Gn (also referred to as a "scan signal"), a data line 171 transmitting a data voltage Dn, and a storage electrode line 177 applied with a predetermined storage voltage SL.

A first thin film transistor T1 and a second thin film transistor T2 that are connected to the same gate line 121 and the same data line 171 are formed. Further, a third thin film transistor T3 that is connected to the same gate line 121 as the first and second thin film transistors T1 and T2, and is also connected to the second thin film transistor T2 and the storage electrode line 177, is further formed.

Each pixel PX includes two subpixels PXa and PXb, and the first subpixel PXa includes a first thin film transistor T1, a first liquid crystal capacitor Clca, and a first storage capacitor Csta. The second subpixel PXb includes a second thin film transistor T2, a third thin film transistor T3, a second liquid crystal capacitor Clcb, a second storage capacitor Cstb, and a step-down capacitor Cstd.

The first thin film transistor T1 includes a first terminal connected to the gate line 121, a second terminal connected to the data line 171, and a third terminal that is connected to the first liquid crystal capacitor Clca and the first storage capacitor Csta. The second thin film transistor T2 includes a first terminal connected to the gate line 121, a second terminal connected to the data line 171, and a third terminal that is connected to the second liquid crystal capacitor Clcb and the second storage capacitor Cstb. The third thin film transistor T3 includes a first terminal connected to the gate line 121, a second terminal connected to the third terminal of the second thin film transistor T2, and a third terminal that is connected to the step-down capacitor Cstd. The step-down capacitor Cstd is connected to an output terminal of the third thin film transistor Qc and the storage electrode line 177.

Referring to an operation of the pixel PX, if the gate line 121 is applied with a gate-on voltage, the first, second, and third thin film transistors T1, T2, and T3 connected to the gate line 121 are turned on, and the first liquid crystal capacitor Clca and the second liquid crystal capacitor Clcb are charged by the data voltage transmitted through the data line 171. Wince the third thin film transistor T3 is turned on, some of the voltage charged in the second liquid crystal capacitor Clcb may leak through the storage electrode line SL. Accordingly, even though the data voltages that are transmitted to the first subpixel PXa and the second subpixel PXb through the data line 171 are equal to each other, the voltages that are charged in the first liquid crystal capacitor Clca and the second liquid crystal capacitor Clcb may be different from each other. For example, the voltage that is charged in the second liquid crystal capacitor Clcb is lower than the voltage that is charged in the first liquid crystal capacitor Clca. The difference of the voltages that are charged in the different subpixels PXa and PXb of the same pixel PX improves the side visibility.

Figure 4:
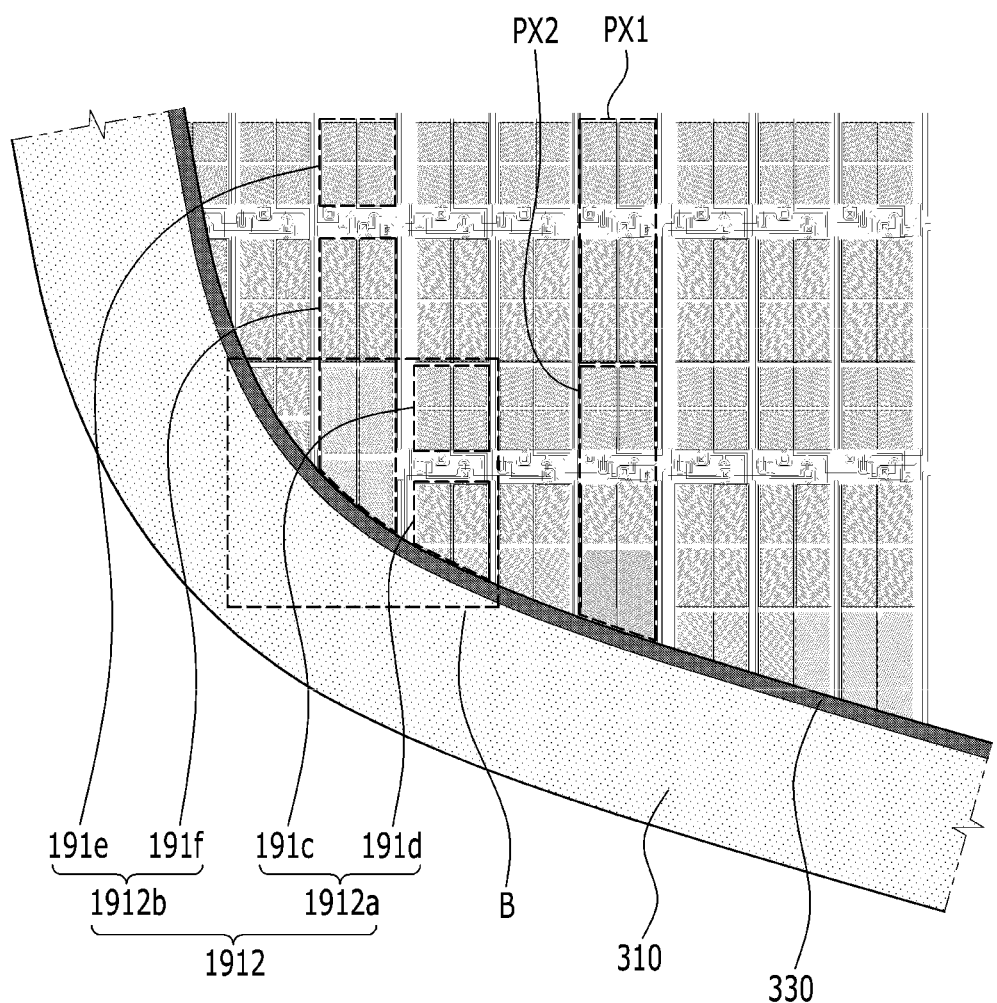
FIG. 4 is an enlarged top plan view of a portion A of FIG. 2.
Figure 5:
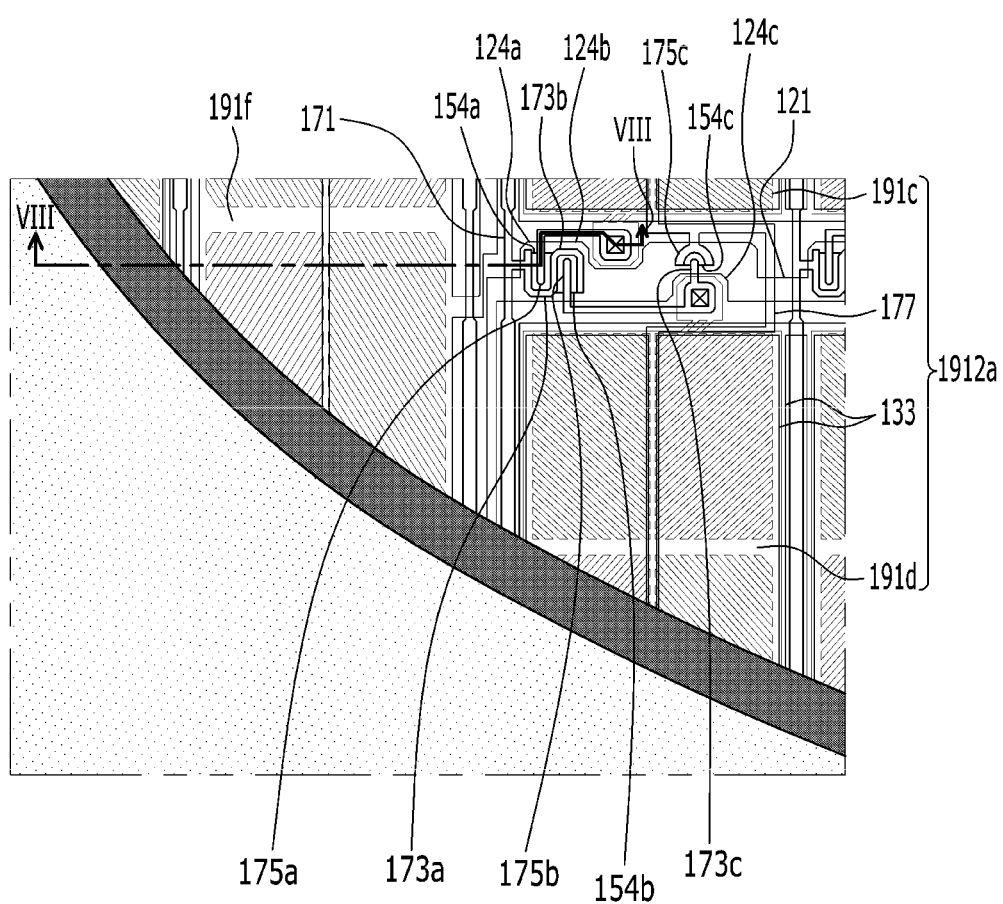
FIG. 5 is an enlarged layout view of a portion B of FIG. 4.
Figure 6:
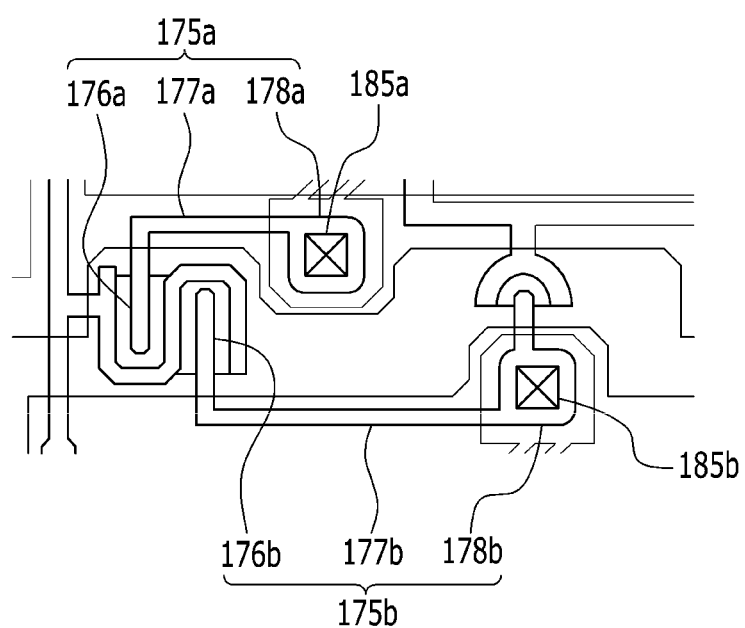
FIG. 6 is an enlarged layout view of a first drain electrode and a second drain electrode of FIG. 5.
Figure 7:
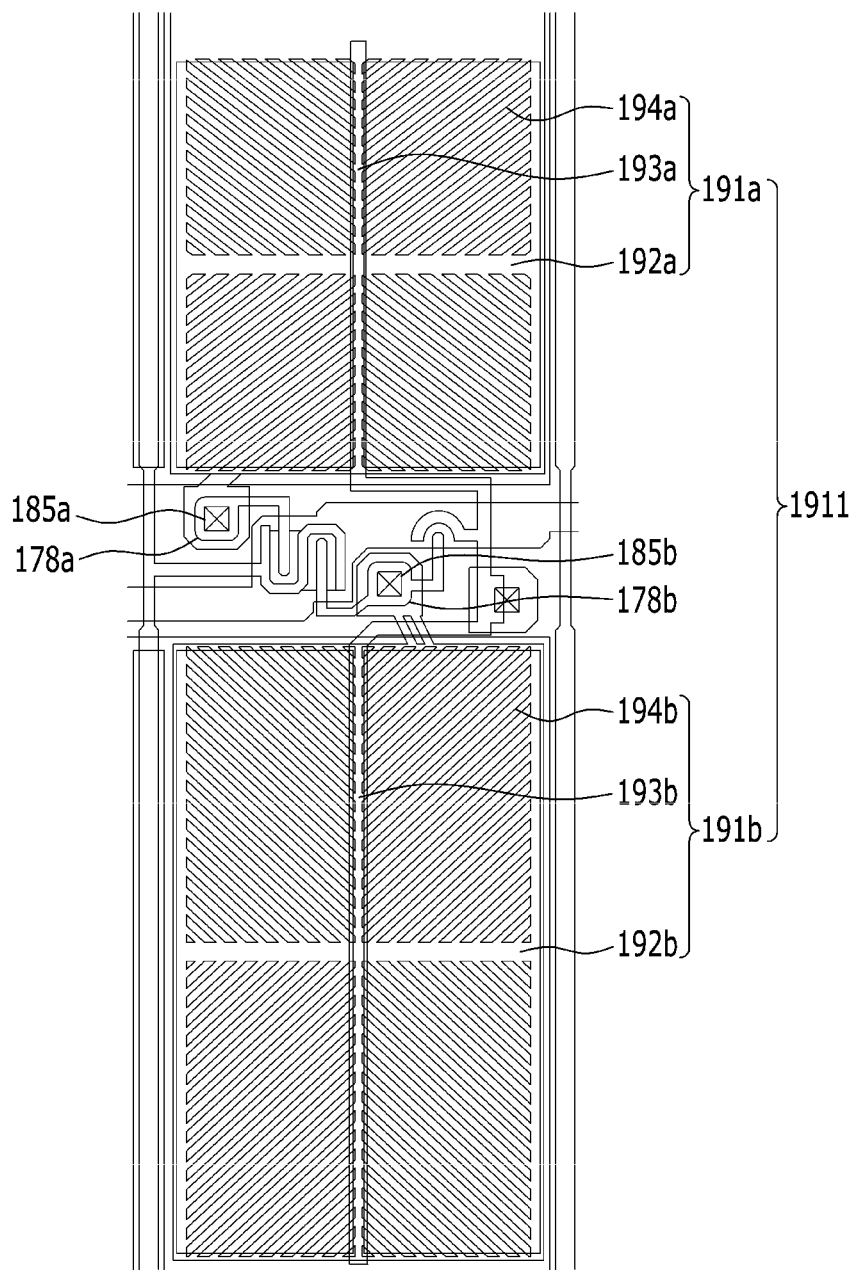
FIG. 7 is an enlarged layout view of a normal pixel PX1 of FIG. 4.
Figure 8:
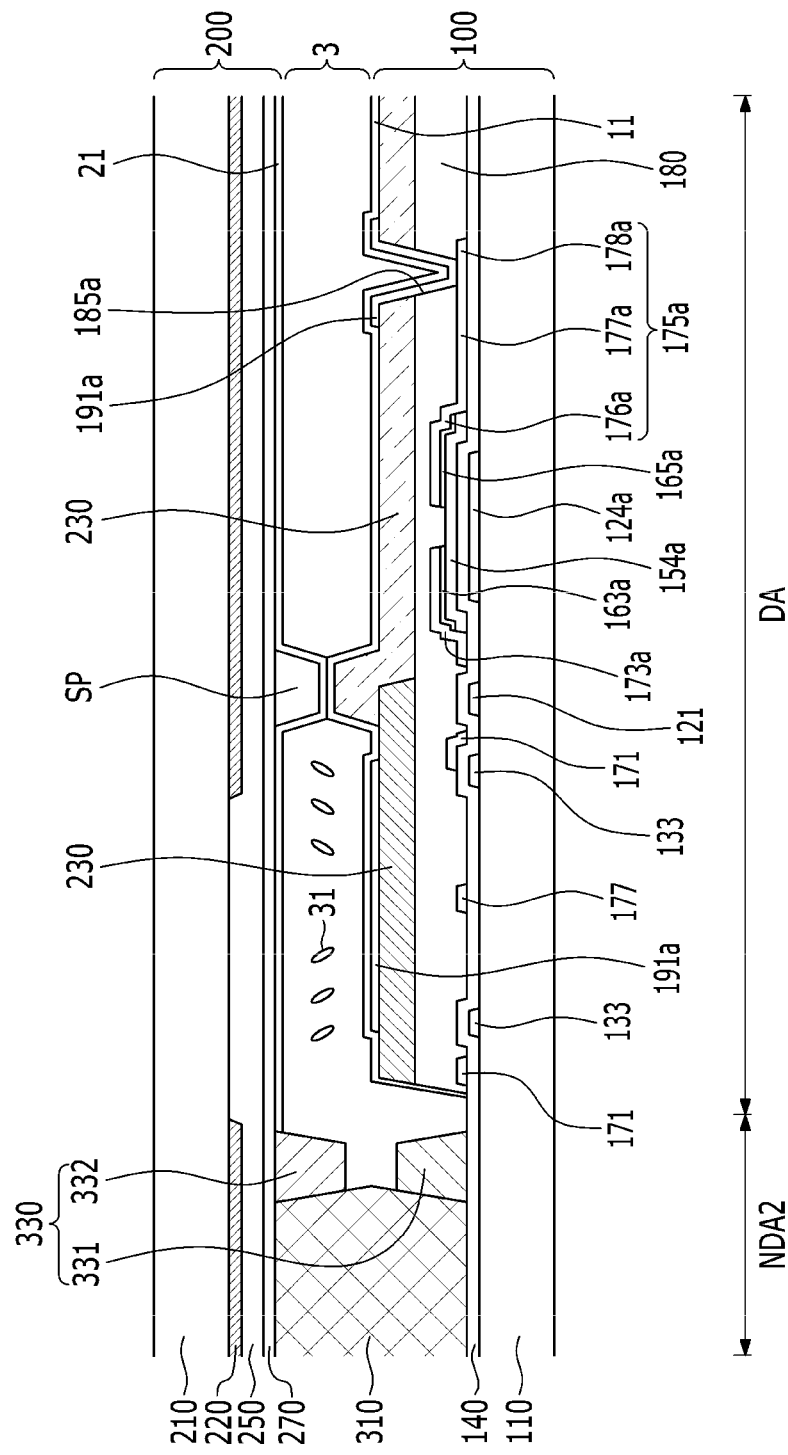
FIG. 8 is a cross-sectional view taken along a line VIII-VIII of FIG. 5.

Next, the detailed structure of a normal pixel and a corner pixel and the structure of the sealant will be described with reference to FIG. 4, FIG. 5, FIG. 6, FIG. 7, and FIG. 8. FIG. 4 is an enlarged top plan view of a portion A of FIG. 2. FIG. 5 is an enlarged layout view of a portion B of FIG. 4. FIG. 6 is an enlarged layout view of a first drain electrode and a second drain electrode of FIG. 5. FIG. 7 is an enlarged layout view of a normal pixel PX1 of FIG. 4. FIG. 8 is a cross-sectional view taken along line VIII-VIII of FIG. 5.

As shown in FIG. 2 and FIG. 4, a plurality of normal pixels PX1 is formed in the center region DA1 and the edge region DA21, and a plurality of corner pixels PX2 is formed in the corner region DA22. FIG. 4 only shows one corner pixel PX2, however it is not limited thereto, and the corner pixel PX2 may include a plurality of the pixels adjacent to the corner sealant 310.

First, the normal pixel PX1 positioned in the lower panel 100 will be described in detail. A gate metal layer including a gate line 121, a first gate electrode 124a, a second gate electrode 124b, and a third gate electrode 124c is formed on a display substrate 110 of the lower panel 100. The display substrate 100 may be made of transparent glass or plastic.

The gate line 121 mainly extends in a horizontal direction and transmits a gate signal. The first gate electrode 124a and the second gate electrode 124b protrude from the gate line 121. The first gate electrode 124a and the second gate electrode 124b are adjacent to each other and protrude upward from the gate line 121 in the plan view of FIG. 5, and the first gate electrode 124a may be positioned farther to the right than the second gate electrode 124b. The third gate electrode 124c is separated from the first gate electrode 124a and the second gate electrode 124b by a predetermined interval. The third gate electrode 124c protrudes upward from the gate line 121. The first gate electrode 124a, the second gate electrode 124b, and the third gate electrode 124c are connected to the same gate line 121 and receive a same gate signal.

A storage electrode 133 may be further formed on the display substrate 110. The storage electrode 133 may be formed to enclose the edges of two subpixels PXa and PXb. The plurality of storage electrodes 133 positioned in the adjacent pixels PX are connected to each other. A constant voltage such as a common voltage is applied to the storage electrode 133.

A gate insulating layer 140 is formed on the gate line 121, the first gate electrode 124a, the second gate electrode 124b, the third gate electrode 124c, and the storage electrode 133. The gate insulating layer 140 may be formed with an inorganic insulating material such as a silicon nitride (SiNx) or a silicon oxide (SiOx). The gate insulating layer 140 may also be formed in a single layer or multiple layers.

A first semiconductor 154a, a second semiconductor 154b, and a third semiconductor 154c are formed on the gate insulating layer 140. The first semiconductor 154a may be provided on the first gate electrode 124a, the second semiconductor 154b may be provided on the second gate electrode 124b, and the third semiconductor 154c may be provided on the third gate electrode 124c. The first semiconductor 154a, the second semiconductor 154b, and the third semiconductor 154c may be formed of an amorphous silicon, a polycrystalline silicon, or a metal oxide.

Although not shown, an ohmic contact may be provided on the first semiconductor 154a, the second semiconductor 154b, and the third semiconductor 154c. The ohmic contact may be made of a material such as a silicide or an n+ hydrogenated amorphous silicon with an n-type impurity doped at a high concentration.

A data metal layer includes a storage electrode line 177, a data line 171, a first source electrode 173a, a first drain electrode 175a, a second source electrode 173b, a second drain electrode 175b, a third source electrode 173c, and a third drain electrode 175c. The data metal layer is formed on the first, second, and third semiconductors 154a, 154b, and 154c, and the gate insulating layer 140.

As shown in FIG. 5, the first, second, and third semiconductors 154a, 154b, and 154c are only formed on the first, second, and third gate electrodes 124a, 124b, and 124c, and the first semiconductor 154a and the second semiconductor 154b are connected to each other. However, the present disclosure is not limited thereto, and first, second, and third semiconductors 154a, 154b, and 154c may be formed under the data line 171, and the first semiconductor 154a and the second semiconductor 154b may be separated from each other.

The storage electrode line 177 transmits a predetermined voltage and mainly extends in a vertical direction, crossing the gate line 121. The storage electrode line 177 may be formed in a vertical direction at each center of the subpixels PXa and PXb. The storage electrode line 177 is formed to detour into the edge in the region between two subpixels PXa and PXb. The storage electrode line 177 does not overlap the first gate electrode 124a and the second gate electrode 124b. The storage electrode line 177 may be applied with the same voltage as the storage electrode 133 or a different voltage. For example, a difference of about 3V may be generated between the voltage applied to the storage electrode line 177 and the voltage applied to the storage electrode 133.

The data line 171 transmits the data signal and mainly extends in a vertical direction, thereby crossing the gate line 121. The data line 171 is formed in a direction substantially parallel to the storage electrode line 177 in the same layer as the storage electrode line 177.

The first source electrode 173a protrudes onto the first gate electrode 124a from the data line 171. The first source electrode 173a may be bent to have a C shape on the first gate electrode 124a.

The first drain electrode 175a is formed on the first gate electrode 124a to be separated from the first source electrode 173a. A channel is formed in the first semiconductor 154a of the exposed portion between the first source electrode 173a and the first drain electrode 175a that are formed to be separated from each other.

As shown in FIG. 6, the first drain electrode 175a includes a first bar part 176a overlapping the first gate electrode 124a, a first extension part 177a extending from the first bar part 176a, and a first extension part 178a extending from the first extension part 177a. The first bar part 176a is enclosed by the first source electrode 173a.

The second source electrode 173b is formed on the second gate electrode 124b to extend from the first source electrode 173a. The second source electrode 173b may be bent to have a C shape on the second gate electrode 124b.

The second drain electrode 175b is formed on the second gate electrode 124b to be separated from the second source electrode 173b. A channel is formed in the second semiconductor 154b of the exposed portion between the second source electrode 173b and the second drain electrode 175b that are formed to be separated from each other.

As shown in FIG. 6, the second drain electrode 175b includes a second bar part 176b overlapping the second gate electrode 124b, a second extension part 177b extending from the second bar part 176b, and a second extension part 178b extending from the second extension part 177b. The second bar part 176b is enclosed by the second source electrode 173b.

The third source electrode 173c is connected to the second drain electrode 175b, particularly to the second extension part 178b of the second drain electrode 175b, and is provided on the third gate electrode 124c. The third source electrode 173c is formed of a bar shape.

The third drain electrode 175c is formed on the third gate electrode 124c to be separated from the third source electrode 173c. The third drain electrode 175c may be bent to have a C shape on the third gate electrode 124c. A channel is formed in the third semiconductor 154c of the exposed part between the third source electrode 173c and the third drain electrode 175c that are formed to be separated from each other.

The first gate electrode 124a, the first semiconductor 154a, the first source electrode 173a, and the first drain electrode 175a form a first thin film transistor T1. Also, the second gate electrode 124b, the second semiconductor 154b, the second source electrode 173b, and the second drain electrode 175b form a second thin film transistor T2. The third gate electrode 124c, the third semiconductor 154c, the third source electrode 173c, and the third drain electrode 175c form a third thin film transistor. The first thin film transistor T1, the second thin film transistor T2, and the third thin film transistor T3 form a normal switching element.

A first passivation layer 180 is formed to cover the data line 171, the first, second, and third source electrodes 173a, 173b, and 173c, and the first, second, and third drain electrodes 175a, 175b, and 175c. The first passivation layer 180 may be made of an inorganic insulating material.

A second passivation layer 230 is formed on the first passivation layer 180. The second passivation layer 230 may be made of an organic insulating material, particularly a color filter. The color filter may express one of the primary colors. The primary colors may include three primary colors, such as red, green, and blue, or yellow, cyan, and magenta. The color filter may be further configured with a color filter for expressing a mixed color of the primary colors or white.

The first passivation layer 180 and the second passivation layer 230 have a first contact hole 185a exposing at least a portion of the first drain electrode 175a and a second contact hole 185b exposing at least a portion of the second drain electrode 175b. The first contact hole 185a may expose the first extension part 178a of the first drain electrode 175a. The second contact hole 185b may expose the second extension part 178b of the second drain electrode 175b.

As shown in FIG. 7, a normal pixel electrode 191l of the normal pixel PX1 is formed on the second passivation layer 230, and the normal pixel electrode 191l includes a first subpixel electrode 191a and a second subpixel electrode 191b.

The first subpixel electrode 191a is connected to the first drain electrode 175a through the first contact hole 185a, and the second subpixel electrode 191b is connected to the second drain electrode 175b through the second contact hole 185b. Particularly, the first subpixel electrode 191a may be connected to the first extension part 178a of the first drain electrode 175a, and the second subpixel electrode 191b may be connected to the second extension part 178b of the second drain electrode 175b.

The first subpixel electrode 191a and the second subpixel electrode 191b respectively receive the data voltage from the first drain electrode 175a and the second drain electrode 175b. At this time, a portion of the data voltage applied to the second drain electrode 175b is divided through the third source electrode 173c such that the voltage applied to the second subpixel electrode 191b may be lower than the voltage applied to the first subpixel electrode 191a. In this case, the data voltage applied to the first subpixel electrode 191a and the second subpixel electrode 191b is positive, whereas when the data voltage applied to the first subpixel electrode 191a and the second subpixel electrode 191b is negative. The voltage applied to the first subpixel electrode 191a may be lower than the voltage applied to the second subpixel electrode 191b.

An area of the second subpixel electrode 191b may be approximately one to two times larger than that of the first subpixel electrode 191a. The first and second subpixel electrodes 191a and 191b include cross-shaped stem portions having an overall quadrangular shape that are adjacent to each other in a column direction, and include horizontal stem portions 192a and 192b and vertical stem portions 193a and 193b that are perpendicular to each other. In addition, the first and second subpixel electrodes 191a and 191b are divided into four subregions by the horizontal stem portions 192a and 192b and the vertical stem portions 193a and 193b, and each subregion includes a plurality of minute branch portions 194a and 194b.

A first minute branch portions 194a and 194b disposed in the four subregions obliquely extends in an upper left direction from the horizontal stem portions 192a and 192b or the vertical stem portions 193a and 193b, and a second minute branch portions 194a and 194b obliquely extends in an upper right direction from the horizontal stem portions 192a and 192b or the vertical stem portions 193a and 193b. Further, a third minute branch portions 194a and 194b disposed in the four subregions obliquely extends in a lower left direction from the horizontal stem portions 192a and 192b or the vertical stem portions 193a and 193b, and a fourth minute branch portions 194a and 194b obliquely extend in a lower right direction from the horizontal stem portions 192a and 192b or the vertical stem portions 193a and 193b.

Each of the minute branch portions 194a and 194b forms an angle of approximately 40° to 45° with the gate line 121 or the horizontal stem portions 192a and 192b. In addition, the minute branch portions 194a and 194b of the two adjacent subregions may be perpendicular to each other. A first alignment layer 11 is formed on the normal pixel electrode 191l.

Next, the upper panel 200 will be described. In the upper panel 200, a light blocking member 220 is formed on a facing substrate 210 made of transparent glass or plastic. The light blocking member 220 is also referred to as a black matrix and prevents light leakage. The light blocking member 220 may overlap the gate line 121, the data line 171, the first, second, and third thin film transistors T1, T2, and T3, and the first contact hole 185a and second contact holes 185b.

An overcoat 250 may be formed on the light blocking member 220, and a common electrode 270 is formed on the overcoat 250. Also, a spacer 32 may be formed on the common electrode 270 to maintain an interval between the lower panel 100 and the upper panel 200. A second alignment layer 21 is formed to cover the common electrode 270 and the spacer SP.

In the above, the light blocking member 220 and the common electrode 270 are formed in the upper panel 200, however the present disclosure is not limited thereto. For example, the light blocking member 220 and the common electrode 270 may be formed in the lower panel 100.

The liquid crystal layer 3 is positioned between the lower panel 100 and the upper panel 200. The liquid crystal layer 3 includes the liquid crystal molecules 31 that have negative dielectric anisotropy, and the liquid crystal molecules 31 may be aligned such that their long axes are substantially perpendicular to a surface of the lower panel 100 when no electric field is present. That is, a vertical alignment may be realized.

On the other hand, the plurality of corner pixels PX2 and the corner sealant 310 formed in the corner region DA22 do not overlap and are separated from each other. That is, the corner sealant 310 is separated from an outer boundary of the corner pixel PX2.

The corner pixel PX2 has a substantially similar structure to the structure of the normal pixel, such that a duplicate description of the corner pixel PX2 is omitted. Referring to FIG. 4, a portion of the corner pixel electrode 1912a of the corner pixel PX2 is cut such that the size of the corner pixel PX2 is reduced. Conversely, a portion of the corner pixel electrode 1912b is partially extended such that the size of the corner pixel PX2 is enlarged. That is, the size of the corner pixel electrode 1912 is different from the size of the normal pixel electrode 1911. Depending on the location and proximity to the outer line of the corner sealant 310, the size of the corner pixel electrode 1912 may be larger or smaller than the size of the normal pixel electrode.

According to one embodiment, the corner pixel electrode 1912 is formed of the same shape as the outer line of the corner sealant 310, and the corner pixel electrode 1912 may not overlap the corner sealant 310. The corner pixel electrode 1912 includes a first corner pixel electrode 1912a that is smaller than the size of the normal pixel electrode 1911 and a second corner pixel electrode 1912b that is larger than the size of the normal pixel electrode 1911.

The first corner pixel electrode 1912a includes a third subpixel electrode 191c and a fourth subpixel electrode 191d. The fourth subpixel electrode 191d of the first corner pixel electrode 1912a is formed to be smaller than the size of the second subpixel electrode 191b of a normal pixel electrode 1911. That is, the fourth subpixel electrode 191d of the first corner pixel electrode 1912a is cut in the portion overlapping the corner sealant 310. As a result, the fourth subpixel electrode 191d of the first corner pixel electrode 1912a does not overlap the corner sealant 310.

The second corner pixel electrode 1912b includes a fifth subpixel electrode 191e and a sixth subpixel electrode 191f. The sixth subpixel electrode 191f of the second corner pixel electrode 1912b is formed to be larger than the size of the second subpixel electrode 191b of a normal pixel electrode 1911. That is, the sixth subpixel electrode 191f of the second corner pixel electrode 1912b extends to the immediately preceding outer line of the corner sealant 310, and the sixth subpixel electrode 191f of the second corner pixel electrode 1912b does not overlap the corner sealant 310.

As described above, by reducing or expanding the size of a corner pixel electrode of a corner pixel, the corner pixel electrode does not overlap the sealant, thereby preventing pixel failure. Accordingly, even if a perpendicularly formed sealant coating device is not separately used, failures of the pixels positioned near or at the corners may be reduced or eliminated.

Also, the corner sealant 310 may be formed to be rounded, and the corner of the liquid crystal display may be formed to be rounded to minimized the effects of an external impact and enhance the design characteristics.

Also, the sealant and the corner pixel do not overlap such that a degree of the spread of the sealant is uniform in the assembly after a coating process. Accordingly, the non-uniform spread of the sealant that may occur when the sealant and the corner pixel overlap each other can be prevented.

Next, the lower panel 100 and the upper panel 200 will be described in the second non-display area NDA2. As shown in FIG. 8, in the lower panel 100, the gate insulating layer 140 is formed on the display substrate 110. Also, the corner sealant 310 and a lower dam 331 are formed on the gate insulating layer 140. The lower dam 331 is formed between the corner sealant 310 and the corner pixel PX2. According to one embodiment, the lower dam 331 is formed in the same layer as the second passivation layer 230 and of the same material as the second passivation layer 230.

In the upper panel 200, the light blocking member 220 is formed on the facing substrate 210, the overcoat 250 is formed on the light blocking member 220, and the common electrode 270 is formed on the overcoat 250. Also, an upper dam 332 is formed on the common electrode 270. The upper dam 332 is formed at a position corresponding to the lower dam 331. According to one embodiment, the upper dam 332 is formed in the same layer as the spacer SP and is made of the same material as the spacer SP.

The lower dam 331 and the upper dam 332 together form a dam 330 and may prevent the sealant 310 from spreading to the display area when combining the lower panel 100 and the upper panel 200.

While the present disclosure has been described in connection with practical exemplary embodiments, it is understood that the present disclosure is not limited to the disclosed embodiments, but, on the contrary, is intended to cover various modifications and equivalent arrangements included within the spirit and scope of the present disclosure.

DESCRIPTION OF SYMBOLS

| | |
|---|---|
| 300: sealant | 310: corner sealant |
| 320: edge sealant | 1911: normal pixel electrode |
| 1912: corner pixel electrode | 191a: first subpixel electrode |
| 191b: second subpixel electrode | 1912a: first corner pixel electrode |
| 1912b: second corner pixel electrode | 191c: third subpixel electrode |
| 191d: fourth subpixel electrode | 191e: fifth subpixel electrode |
| 191f: sixth subpixel electrode | |

What is claimed is:

1. A liquid crystal display comprising:
   a display substrate including a display area displaying an image and a non-display area adjacent to the display area;
   a plurality of normal pixels disposed in a center region of the display area, and a plurality of corner pixels disposed in a corner region of the display area;
   a sealant disposed in the non-display area of the display substrate;
   a lower dam disposed in the non-display area of the display substrate;
   a facing substrate facing the display substrate;
   an upper dam disposed on the facing substrate;

a color filter layer comprising a plurality of color filters that are disposed under pixel electrodes of a normal pixel and a corner pixel;
a common electrode formed on the facing substrate; and
a spacer formed on the common electrode,
wherein a corner pixel of the plurality of corner pixels is disposed adjacent to the sealant in the corner region of the display area and has a size that is different from a size of a normal pixel,
wherein the sealant includes a corner sealant disposed at a position corresponding to the corner region and an edge sealant disposed at a position corresponding to the edge region,
wherein a part of the corner pixel is formed of a same shape of an outer line of the corner sealant,
wherein the outer line of the corner sealant is formed to be rounded,
wherein the corner pixel and the sealant are separated from each other,
wherein the lower dam and the upper dam are disposed at positions facing each other between the corner pixel and the sealant, and
wherein the upper dam is disposed in a same layer as the spacer.

2. The liquid crystal display of claim 1, wherein:
the corner pixel and the sealant do not overlap each other.

3. The liquid crystal display of claim 1, wherein:
the corner sealant is separated from an outer boundary of the corner pixel.

4. The liquid crystal display of claim 1, wherein:
the normal pixel includes a normal switching element and a normal pixel electrode connected to the normal switching element,
the corner pixel includes a corner switching element and a corner pixel electrode connected to the corner switching element, and
a size of the corner pixel electrode is different from a size of the normal pixel electrode.

5. The liquid crystal display of claim 4, wherein:
a part of the corner pixel electrode is disposed to conform to the shape of the outer line of the corner sealant.

6. The liquid crystal display of claim 4, wherein:
the corner pixel electrode does not overlap the corner sealant.

\* \* \* \* \*